US008999089B2

(12) United States Patent
Cartabbia (10) Patent No.: US 8,999,089 B2
(45) Date of Patent: Apr. 7, 2015

(54) MACHINE FOR MAKING AN IMPERMEABLE JOIN ON IMPERMEABLE THREE-LAYER OR TWO-LAYER FABRICS

(75) Inventor: Giovanni Cartabbia, Sarnico (IT)

(73) Assignee: MACPI S.p.A. Pressing Division, Palazzolo Sull'oglio (BS) (IT)

( * ) Notice: Subject to any disclaimer, the term of this patent is extended or adjusted under 35 U.S.C. 154(b) by 305 days.

(21) Appl. No.: 13/526,831

(22) Filed: Jun. 19, 2012

(65) Prior Publication Data

US 2012/0328824 A1  Dec. 27, 2012

(30) Foreign Application Priority Data

Jun. 24, 2011 (IT) .............................. MI2011A1159
Jul. 28, 2011 (IT) .............................. MI2011A1425

(51) Int. Cl.
*B32B 37/00* (2006.01)
*B29C 65/00* (2006.01)
(Continued)

(52) U.S. Cl.
CPC ........... *B29C 66/7292* (2013.01); *B29C 65/505* (2013.01); *B29C 65/5092* (2013.01); *B29C 65/62* (2013.01); *B29C 65/72* (2013.01); *B29C 66/0242* (2013.01); *B29C 66/112* (2013.01); *B29C 66/1122* (2013.01); *B29C 66/133* (2013.01); *B29C 66/135* (2013.01); *B29C 66/73182* (2013.01); *B29C 66/73187* (2013.01); *B29C 66/83413* (2013.01); *B29C 66/919* (2013.01); *B29C 66/93411* (2013.01); *B29C 66/93451* (2013.01); *B32B 27/12* (2013.01); *D06H 5/00* (2013.01); *B32B 5/022* (2013.01); *B32B 5/024* (2013.01); *B29C 65/103* (2013.01); *B29C 66/0384* (2013.01); *B29C 65/4815* (2013.01); *B29C 66/9141* (2013.01); *A41D 27/245* (2013.01); *B29C 35/08* (2013.01);
(Continued)

(58) Field of Classification Search
USPC ...................... 156/82, 308.2, 308.4, 497, 499
See application file for complete search history.

(56) References Cited

U.S. PATENT DOCUMENTS 6,471,803 B1 * 10/2002 Pelland et al. .................. 156/64
6,913,665 B2 * 7/2005 Zurmuehle et al. ............. 156/71

(Continued)

FOREIGN PATENT DOCUMENTS

EP        2098630 A2     9/2009

OTHER PUBLICATIONS

Search Report from IT Appl No. MI2011A1159 dated Mar. 6, 2012.

*Primary Examiner* — James Sells
(74) *Attorney, Agent, or Firm* — Novak Druce Connolly Bove + Quigg LLP (57) ABSTRACT

A machine for making an impermeable join between two panels made of three-layer or two-layer textile material including at least an internal layer, already joined along a joining line by way of a stitching operation, simple or complex, or by ultrasound joining or other, includes first movement element able to move the textile material in a direction of feed and impermeabilization element able to achieve the impermeabilization along said joining line and including second movement element able to move an impermeable tape for hot taping with adhesive, in order to determine the hot application and welding on the internal layer along the joining line. The impermeabilization element also comprise heating element suitable to effect a cauterization of the material of the internal layer and positionable directly upstream of the second movement element in the direction of feed, so that the hot taping can be effected immediately after the cauterization.

18 Claims, 6 Drawing Sheets

(51) Int. Cl.
*B29C 65/50* (2006.01)
*B29C 65/62* (2006.01)
*B29C 65/72* (2006.01)
*B32B 27/12* (2006.01)
*D06H 5/00* (2006.01)
*B32B 5/02* (2006.01)
*B29C 65/10* (2006.01)
*B29C 65/48* (2006.01)
*A41D 27/24* (2006.01)
*B29C 35/08* (2006.01)
*B29C 65/04* (2006.01)
*B29C 65/08* (2006.01)
*B29C 65/74* (2006.01)
*B29C 35/04* (2006.01)
*B29L 31/48* (2006.01)
*A41H 43/04* (2006.01)

(52) U.S. Cl.
CPC ............... *B29C65/04* (2013.01); *B29C 65/08* (2013.01); *B29C 65/74* (2013.01); *B29C 66/72941* (2013.01); *B29C 66/8167* (2013.01); *B29C 66/841* (2013.01); *B29C 66/8748* (2013.01); *B29C 66/929* (2013.01); *B29C 66/9672* (2013.01); *B29C 2035/046* (2013.01); *B29L 2031/4842* (2013.01); *A41H 43/04* (2013.01); *B29C 66/9261* (2013.01)

(56) References Cited

U.S. PATENT DOCUMENTS

| | | | |
|---|---|---|---|
| 7,005,021 B2 * | 2/2006 | Kramer | 156/73.4 |
| 7,117,545 B2 | 10/2006 | Hannon et al. | |
| 7,743,809 B2 * | 6/2010 | Seo | 156/497 |
| 2003/0010439 A1 | 1/2003 | Fenton | |
| 2006/0000546 A1 | 1/2006 | Liao et al. | |
| 2009/0199970 A1 | 8/2009 | Cartabbia | |

* cited by examiner fig.1 fig.4 fig.3 fig.2 fig.7 fig.8 fig.9 fig.10 fig.11 fig.12 fig.13a fig.12a fig.13 fig. 14 fig. 15 fig. 15a fig. 16a fig. 16

MACHINE FOR MAKING AN IMPERMEABLE JOIN ON IMPERMEABLE THREE-LAYER OR TWO-LAYER FABRICS

CROSS-REFERENCE TO RELATED APPLICATIONS

This claims the benefit of Italian Patent Application No. MI2011A001159, filed on 24 Jun. 2011 and Italian Patent Application No. MI2011A001425, filed on Jul. 28, 2011.

FIELD OF THE INVENTION

The present invention concerns a machine for making an impermeable join on three-layer or two-layer fabrics that are impermeable to fluids, in particular liquids, to obtain protective garments or other products impermeable to liquids.

BACKGROUND OF THE INVENTION

It is known to make composite textile products by lining or laminating fabrics associated with membrane layers that function as a barrier against liquids, in order to obtain protective garments or other products that are impermeable from the outside to the inside, but transpirant, that is, they allow fluids to pass from the inside to the outside.

One known textile product is the three-layer type and comprises a first external layer, a second intermediate layer and a third internal layer. The first external layer is a layer of textile material of various type, which may or may not comprise a textile structure of various type. The second intermediate layer is a sheet or film of polymeric material which functions as a barrier against liquids from outside to inside and as a membrane that is transpirant to fluids from inside to outside. The third internal layer is generally made by means of a complex textile structure, for example fleece or pile, meaning a fabric worked in different ways, by shaping, incisions, reliefs, or a fibrous or filament structure, including woven or non-woven materials, knitted fabrics, brushed, teaseled, carded materials or other.

Normally, the three-layer textile product is supplied cut into panels which, to make the impermeable garments or other products in question, are joined to each other along suitably made joining lines, so that they are comfortable for the user. The textile products are in fact also called "soft-shell", because they must have flexible and soft joins, and constitute durable and resistant materials on the outside, but soft inside, to provide comfort to the touch and wearability.

The joins between the panels of three-layer fabric in question are made by a first stitching operation, using needles, or an ultrasound join or other, along joining edges, and a subsequent taping operation along the sewn edges, that is, appliqués of sealing and impermeabilizing tapes applied hot on the side intended to face the inside during use.

However, the joining step in itself would not guarantee the impermeability of the join, due to the effect of the capillarity of the liquids that penetrate into the fabrics, in particular passing from the first external layer to the third internal layer in correspondence with the stitching zone. Indeed, the individual threads used to make the textile material are formed by filaments which create unsealable interstices between them, through which the liquids are absorbed due to capillarity or seepage.

To obviate this problem it is known, for example from the patent U.S. Pat. No. 7,117,545, to carry out an operation, upstream of the first stitching operation, of preparing the fabric by mechanically removing the material which constitutes the internal layer along the edges of the panels which will then be joined, so as to reach and expose the second intermediate impermeable layer which functions as a barrier: this operation is known as fleshing or shaving.

Subsequently, by means of stitching, ultrasound joining, high frequency joining or other, the join is made, taking care to leave visible, at the sides of the joining line, a portion of the second intermediate barrier layer; and finally, the sealing tape is applied astride the joining line directly on the portion of the second intermediate layer left free following the fleshing or shaving Impermeability is obtained thanks to the fact that the sealing tape adheres directly to the second intermediate layer that functions as a barrier.

The preparatory operation of fleshing or shaving is complex and slow because it is necessary to act with extreme skill, since on the one hand it is easy to damage the second intermediate layer below the portion of third layer being removed, and on the other hand it is possible that residues of unremoved third layer may remain, in both cases with negative effects on the impermeabilization.

Furthermore, the preparatory operation, which is carried out using suitable shaving machines, fleshing machines or sanding machines, produces a great quantity of removed material which is dispersed, in the form of powder or light particulate, into the surrounding environment, to the detriment of the operators present.

Other machines that apply a sealing tape are known from US 2003/010439, US 2006/000546 and EP 2.098.630.

Purpose of the present invention is to perfect a machine to make an impermeable join on three-layer or two-layer impermeable fabrics which allows to make the impermeable join quickly, safely and reliably, without having recourse to preparatory operations such as mechanical fleshing, at the same time keeping the impermeability and the minimum thickness of the fabric, which is comfortable, pleasant to the touch and to the eye, and pleasant to wear.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, a machine according to the present invention is able, in a single step or operation, to impermeabilize the join made on two panels of laminated multilayer textile material, three-layer or two-layer, also called soft-shell, comprising an internal layer, and made along a joining line by stitching, simple or complex, ultrasound or high frequency joining, on fabrics in their natural state without any prior operation or treatment being made in correspondence with the lips of the join.

The impermeabilization according to the present invention is obtained with the machine according to the present invention, achieving a seal that is impermeable to fluids, in particular from outside to inside, by means of a cauterization, which can be simple or multiple, on the inside of the textile material and simultaneously applying, by means of hot welding, an adhesive and impermeable tape.

The machine to achieve an impermeable join between the two panels according to the present invention comprises first movement means able to move the textile material in a desired direction of feed and impermeabilization means able to achieve the impermeabilization along the joining line and comprising second movement means able to move an impermeable tape for hot taping with adhesive, in order to determine the hot application and welding on the internal layer along the joining line.

According to one feature of the present invention, the impermeabilization means also comprise heating means suitable to effect a cauterization of the material of the internal layer and positionable directly upstream of the second movement means in the direction of feed, so that the hot taping can be effected immediately after the cauterization.

In this way, with the cauterization heat treatment of the material of the internal layer of textile material, the effect is to modify its structure, and in particular the filament conformation which would normally allow the liquids to pass and seep through capillarity, thus rendering the join between the two panels impermeable.

Furthermore, the machine according to the present invention allows to simplify the process of impermeabilizing the joins compared with the state of the art, because it is possible to obtain this effect effectively in only two substantive steps or operations, that is, joining the panels and cauterizing the join with a corresponding taping.

In one form of embodiment, the heating means comprise a blower device able to blow compressed and super-heated air at least toward the joining line and on the sides adjacent thereto, in order to determine the cauterization of the internal layer. In one form of embodiment, the blower device is also configured to blow heating air toward the tape. This solution is advantageous since it makes the machine according to the present invention more compact and also facilitates the substantially simultaneous execution, that is, in rapid succession, of the cauterization and hot taping operations.

In another form of embodiment, the heating means comprise an irradiation heating device, able to be taken into close proximity, but not in contact, with the internal layer along the joining line, and to heat the internal layer by irradiation, obtaining the cauterization thereof.

This variant solution, which uses an irradiation device, is particularly indicated when the second layer (membrane) and/or the third internal layer consist of thin and light membranes, which are particularly delicate and could be at least partly damaged by the blowing of the compressed and super-heated air.

In another form of embodiment, the same device is used both for heating with compressed and super-heated air, and also for heating by irradiation.

In this solution, the machine is extremely flexible and versatile since it is already equipped substantially for any type of material. It is therefore possible, when working thick and not delicate materials, to use the device with compressed and super-heated air, keeping it slightly distant from the material to be treated and delivering the stream of super-heated air toward the joining line. When working delicate materials, the delivery of compressed air is interrupted, the device is moved closer to a distance in the range of a millimeter to the joining line, and the temperature of the radiant elements of the device is taken to a value in the range of 400° C. or more, to achieve the cauterization through irradiation. Finally, another option also provides to use the combined effect of super-heated air and of irradiation, for example in the case of particularly thick fabrics, for example thick pile.

In one solution of the invention, suitable position detectors are provided, to condition and adjust the correct positioning of the device, increasing or decreasing the distance thereof with respect to the position of the textile material being worked.

In another solution of the present invention, the machine's command and control unit has a database in which various types of fabrics are memorized, to which a specific process to be carried out corresponds: either only with super-heated air, or only by irradiation, or with both heat sources. It may also be provided that with every type of fabric there corresponds a specific distance of the device with respect to the surface of the fabric to be processed.

In this way, when the machine is started, the user will select by type the fabric being worked, and the most suitable option among the three available ones will be selected automatically by the machine, which will also automatically position the heating device at the most suitable distance for that specific textile material.

In operational variants, the compressed air circulates in a feed circuit connected to the blower device and is preferably at a pressure comprised between about 1.5 bar and 2.5 bar.

In some variant solutions, the air is super-heated to a temperature preferably between about 200° C. and about 350° C. To this purpose, in some variants the feed circuit is associated with an air super-heater unit able to increase the temperature of the air in a desired manner In some forms of embodiment, the blower device comprises a first blower nozzle to blow super-heated air, and a second blower nozzle, downstream of the first nozzle in the direction of feed, to blow the hot air toward the tape. Advantageously, in some variants the first and second nozzle are mounted on a single common operating head of the blower device, positionable with respect to the textile material to be impermeabilized.

In variants of these forms of embodiment, the feed circuit comprises two air feed branches that are independent from each other, of which a first branch is connected to the first nozzle and a second branch is connected to the second nozzle.

In some variant solutions, the first nozzle has a single row of delivery channels or a single channel with an elongated shape, in order to determine substantially a single jet or blade of super-heated compressed air and perform a single-track cauterization along the joining line. In alternative variants, the first nozzle has a pair of delivery channels, by means of which a pair of jets of super-heated compressed air is substantially determined, distanced from each other astride the joining line, in order to perform a double-track cauterization along the joining line. Advantageously, the first nozzles with a single delivery channel or with a double channel are interchangeable.

In some forms of embodiment, the position at least of the heating means intended at least for cauterization is advantageously adjustable with respect to the tape and to the textile material which are fed. In variants of these forms of embodiment, the machine according to the present invention comprises a mobile slider on which at least the heating means are mounted. The mobile slider is selectively positionable both in a longitudinal direction parallel to or coinciding with the direction of feed of the textile material, and in a direction transverse to the direction of feed, and also along a desired angular path from and toward the tape and the textile material that are fed.

In advantageous variants of these forms of embodiment, the machine comprises first linear adjustment means to adjust the positioning of the mobile slider in the longitudinal direction. In other variants, the machine comprises second linear adjustment means to adjust the transverse positioning of the mobile slider. Moreover, in other variants, the machine comprises first angular adjustment means that determine the controlled rotation and angular positioning of the mobile slider.

The present invention also concerns impermeabilization means able to achieve the impermeabilization of two panels made of three-layer or two-layer textile material comprising at least an internal layer, already joined along a joining line by means of a stitching operation, simple or complex, or by ultrasound joining or other, along the joining line and comprising movement means able to move an impermeable tape for hot taping with adhesive, in order to determine the hot application and welding on the internal layer along the joining line. According to the present invention, the impermeabilization means also comprise heating means suitable to effect a cauterization of the material of the internal layer and positionable directly upstream of the second movement means in the direction of feed, so that the hot taping can be effected immediately after the cauterization.

The present invention also concerns a method to achieve an impermeable join between two panels made of three-layer or two-layer textile material comprising at least an internal layer, already joined along a joining line by means of a stitching operation, simple or complex, or by ultrasound joining or other, which provides to move the textile material in a direction of feed and to perform the impermeabilization along the joining line by the hot application and welding, on the internal layer along the joining line, of an impermeable tape for hot taping with adhesive. According to the method of the present invention, the impermeabilization provides to effect a cauterization of the material of the internal layer immediately before the hot taping. This obtains the advantages of simplifying known processes, obtaining the purpose of impermeabilizing the join by means of only two steps or operations, that is, joining the panels and cauterizing combined with hot taping.

The present invention also concerns a textile material comprising an impermeable join between two panels made of three-layer or two-layer textile material comprising at least an internal layer, joined along a joining line by means of a stitching operation, simple or complex, or by ultrasound joining or other, comprising an impermeable tape for hot taping with adhesive, applied and welded hot on the internal layer along the joining line. According to the present invention, the internal layer is cauterized at least along the joining line and on portions lateral thereto.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME PREFERENTIAL FORMS OF EMBODIMENT

With reference to the attached drawings, a machine 10 according to the present invention is used to achieve an impermeable join between two panels 12, 14 (FIGS. 7-10) made of three-layer laminated textile material 11, although application to a two-layer textile material or other multilayer materials is not excluded.

According to the present invention, the machine 10 is configured to achieve, with a single operation, the impermeabilization of the join between two panels 12, 14 already subjected to a stitching operation, simple or complex, done with needles, or ultrasound join or other similar or comparable technique, along a corresponding joining line 15.

Each panel 12, 14 is in this case made of a three-layer fabric, formed by a first external layer 16, a second intermediate layer 18 and a third internal layer 20. It is obvious that in the case of a two-layer fabric this configuration may vary, providing in any case an internal layer 20 of the type in question.

The first external layer 16 is made of textile material of various types, which may or may not comprise a complex textile structure.

The second intermediate layer 18 is formed by a film or sheet of polymeric material functioning as a barrier against the liquids from outside to inside, and as a membrane transpirant to fluids from inside to outside.

The third internal layer 20 is made with a complex fabric with a polymeric base, for example synthetic, which can be with a raised nap, such as pile, fleece, teaseled, brushed, or of non-woven fabric, or can have a smooth surface or with relief workings The machine 10 comprises a support plane 22, supported by a lower supporting arm or column 23 constrained to a frame 13 which supports all the operative components, in particular the movement, control, adjustment and heating components of the machine 10, of which more will be said hereafter.

The support plane 22 determines a direction of feed F along which the textile material 11 is fed, to be sealed and taped in correspondence with the joining line 15 between the two panels 12, 14.

Figure 4:
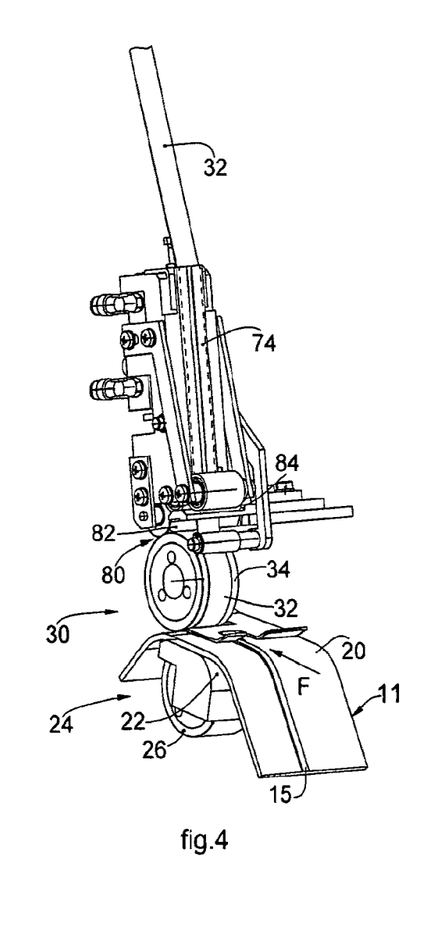
FIG. 4 is a perspective view of part of the machine in FIG. 1.
Figure 5:
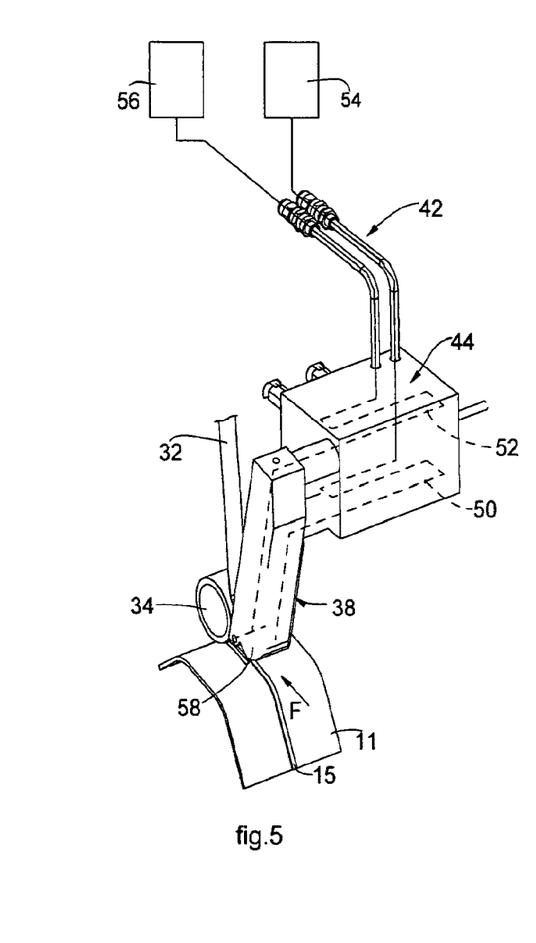
FIG. 5 is a schematic representation of another part of the machine in FIG. 1.
Figure 6:
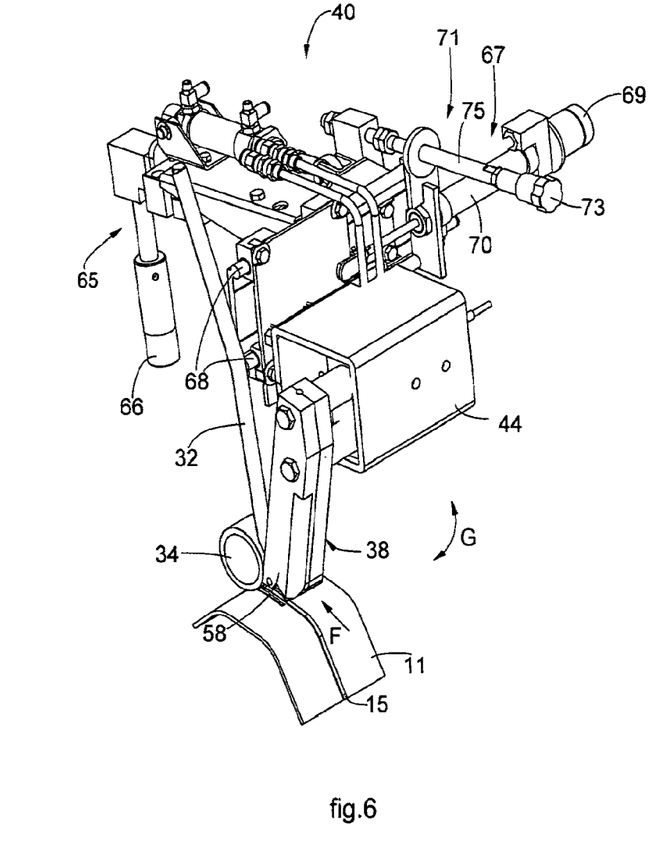
FIG. 6 is a perspective view of another part of the machine in FIG. 1.

A first movement device 24 is also provided (FIG. 4), in this case disposed slightly under the support plane 22, able to determine the selective advance of the textile material 11 along the support plane 22. In particular, the textile material 11 is fed manually with the third layer 20 facing upward and the first layer 16 sliding along the support plane 22.

Figure 1:
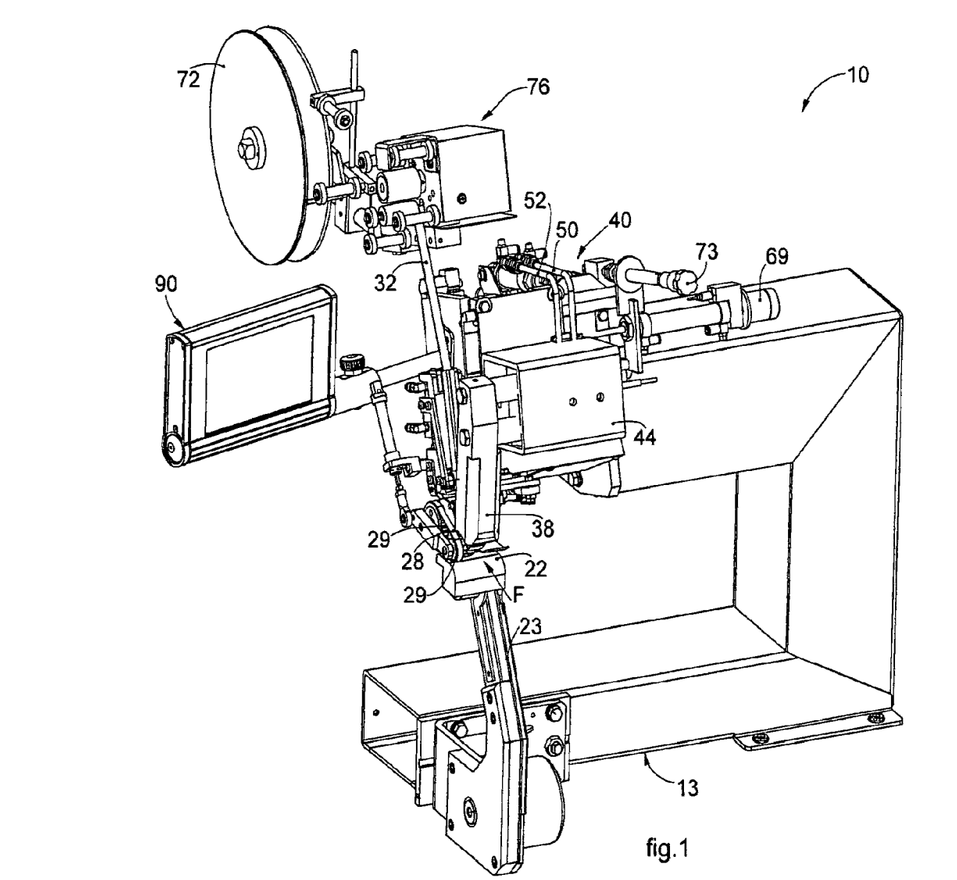
FIG. 1 is a perspective view of a machine for achieving an impermeable join on impermeable three-layer or two-layer fabrics according to the present invention.

In this case, the first movement device 24 comprises a belt 28 associated with two toothed wheels 29 (FIG. 1), able to load the textile material 11, and a first lower wheel 26, associated with the support plane 22, to draw the textile material 11 loaded by the belt 28.

Furthermore, the machine 10 comprises a second movement device 30 (FIG. 4), in this case disposed above the support plane 22, which is configured to feed, in coordination with the advance of the textile material 11, an impermeable welding tape 32 using hot melt adhesion of a known type toward the textile material 11. In this case, the second movement device 30 comprises a second upper wheel 34 which receives the tape 32 and directs it tangentially into contact with the textile material 11 and, a little before adhering to the textile material 11, it is suitably heated so as to start the action of the adhesive which determines the welding of the tape 32, as will be described in more detail hereafter. Furthermore, the second lower wheel 34 cooperates in coupling with the first lower wheel 26 to load the textile material 11. Consequently, the textile material 11 is first loaded by the belt 28 and then drawn by the pair of wheels 26, 34 toward the tape 32. The wheels 26, 34 can be driven at the same speed of rotation, to ensure the synchronous feed of the tape 32 and the textile material 11, or at different speeds, to obtain particular effects, for example curling or suchlike.

The machine 10 also comprises heating means able to determine, advantageously without contact, the cauterization of the material of the third layer 20 along the joining line 15 and on the sides adjacent to it. In the solution shown here, the heating means comprise a blower device 38 able to blow compressed and super-heated air at least toward the joining line 15 and on the sides adjacent to it. The jet of super-heated air is localized, by means of the blower device 38, only in the affected zone, and without entering into contact with it, using temperatures, flow rates and pressures needed to obtain the cauterization of the surface treated.

In particular, cauterization is a heat treatment made locally on the material, which determines a hot structural modification due to the polymeric nature of the material itself. The polymerization of the material of the third layer 20 causes it to compact, substantially eliminating all the cavities or interstices between the filaments or fibers that make up the threads of the material, in this way eliminating the possibility of the liquids migrating through capillarity or seepage. Therefore, the heat treatment of the material of the third layer 20 creates a physical barrier, substantially along the joining line 15 and in the adjacent lateral portions, against the passage of liquids from outside to inside the textile material 11 in question.

The third layer 20, thus cauterized, is ready for the application of the tape 32, both because the surface thus treated prevents the passage of the liquids, and also because the grip of the adhesive of the tape 32 does not take place on filaments which, since they are yielding, would offer little mechanical grip, but on a compact and consistent surface with a good mechanical grip and tearing resistance. Furthermore, cauterization determines a reduction in thicknesses, which is especially useful in fabrics with raised nap and hence a more pleasant feel and wearability.

In the case of cauterization of complex laminated fabrics with a raised nap, the heat treatment completely modifies the structure of the surface fibers since they are polymerized and taken to a plastic state, flattened and partly removed. In the case of cauterization of smooth fabric or with relief workings, the heat treatment eliminates the surface down and the fabric is smooth and compact.

The blower device 38 is fluidically connected with an air feed circuit 42, advantageously compressed air, preferably at a pressure comprised between about 1.5 bar and 2.5 bar, which is in turn advantageously connected to an air compression unit, not shown. The feed circuit 42 is associated with an air super-heater unit 44, disposed downstream of the blower device 38, able to increase the temperature of the compressed air, preferably to between about 200° C. and about 350° C.

The blower device 38 in this case is disposed upstream of the second movement device 30 with respect to the direction of feed F, so that the cauterization occurs a little before, both in spatial and in temporal terms, the deposition and adhesion of the tape 32 along the joining line 15. The blower device 38 in this case comprises a first blower nozzle 46 to blow the super-heated air that cauterizes the third internal layer 20, and a second blower nozzle 48, downstream of the first nozzle 46 in the direction of feed F, to blow the hot heating air to activate the adhesive of the tape 32. In coordination, the feed circuit 42 comprises two air feed branches that are independent from each other, of which a first branch 50 is connected to the first nozzle 46 and a second branch 52 is connected to the second nozzle 48, both passing through the super-heater unit 44. The first branch 50 and the second branch 52 are respectively associated with a first 54 and a second 56 valve, advantageously of the proportional control type, by means of which to control precisely and autonomously the flow rate and pressure of the air delivered.

In particular, the blower device 38 has an operating head 58, on which the first nozzle 46 and the second nozzle 48 are disposed; the operating head 58 is positioned in direct cooperation with the textile material 11 fed on the support plane 22 and also with the tape 32 on which the adhesive is to be applied.

The first nozzle 46 is located on the operating head 58 upstream and at a desired distance from the second nozzle 48, in this case slightly inclined forward with respect to the direction of feed F, so as to distribute better the cauterization action along the joining line 15.

Figure 2:
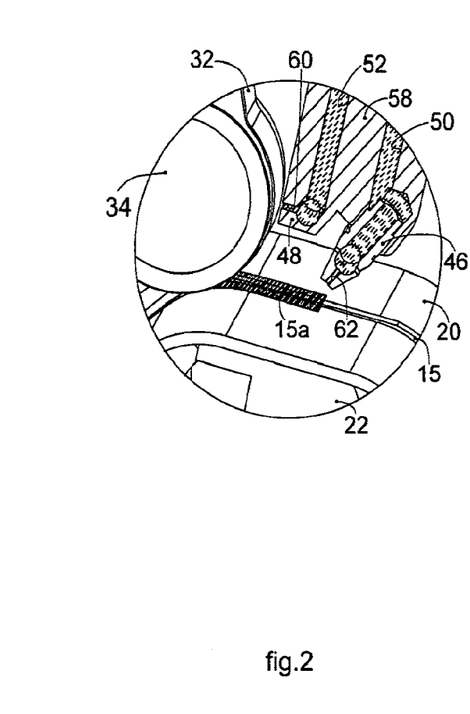
FIG. 2 is an enlarged detail of part of the machine in FIG. 1.
Figure 7:
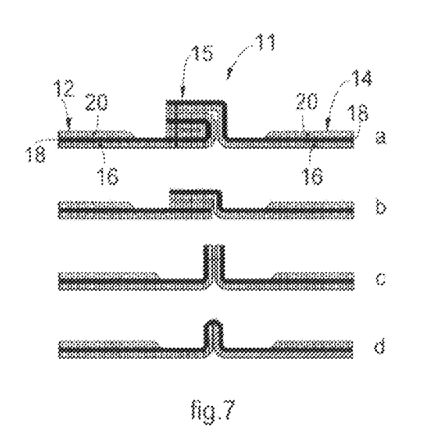
FIG. 7 is a schematic representation in section of two panels of textile material joined together and cauterized with the machine of the present invention.

In the solution shown in FIG. 2, the first nozzle has a single row of delivery channels 62, which develops transverse to the direction of feed along the joining line 15, by means of which a single jet or blade of super-heated compressed air is substantially determined, to perform a single-track cauterization along said joining line 15 (FIG. 7). In this solution, the heat treatment determines a single track 15a of cauterized material which affects both the zone of the joining line 15 and also the portions adjacent to it. In a variant, not shown, instead of the single row formed by a plurality of channels 62, a single delivery channel with an elongated shape could be provided.

Figure 3:
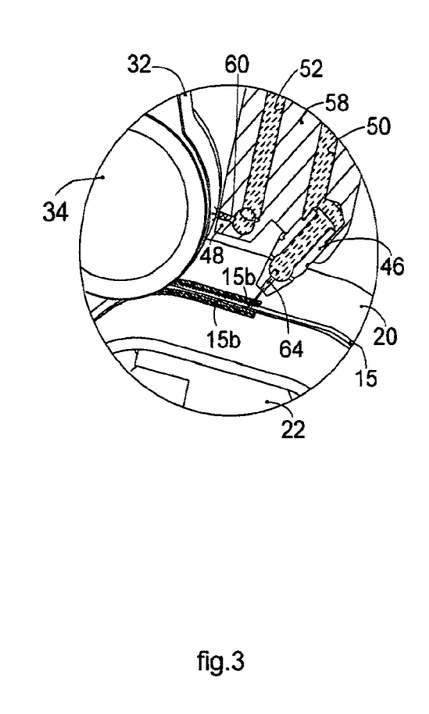
FIG. 3 is a variant of the enlarged detail of FIG. 1.
Figure 9:
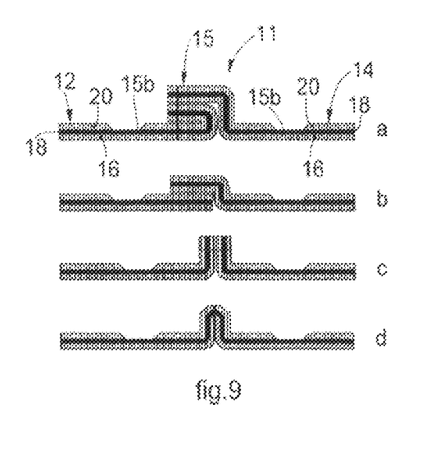
FIG. 9 is a schematic representation in section of two panels of textile material joined together and cauterized according to a variant of the machine of the present invention.

Instead, in the variant in FIG. 3, the first nozzle 46 has a pair of delivery channels 64 (of which only one channel 64 is visible in FIG. 3), by means of which a pair of jets of super-heated compressed air is determined, distanced from each other astride the joining line 15, in order to perform a double-track cauterization along the joining line 15 (FIG. 9). In this solution, the heat treatment determines two distinct and separate tracks 15b of cauterized material which affect only the lateral portions adjacent to the zone of the joining line 15.

In both FIGS. 2 and 3, both the first branch 50 and the second branch 52 are graphically represented with shading, to indicate the presence of the stream of super-heated air.

Advantageously, the first nozzle 46 is the removable type, for example provided with a threaded portion able to be screwed onto the operating head 58, so that it is possible to selectively change the type of air stream emitted, for example to pass from single-track cauterization to double-track cauterization, or if there is a variation in size of the joining lines 15 to be impermeabilized, and hence of the zone to be subjected to cauterization. In this way, by making available different first nozzles 46 for each machine 10, the operator will be able to easily use one or the other format according to needs.

As we said, the tape 32 is fed, in this case from above, in a direction transverse to the textile material 11 introduced on the support plane 22 in the direction of feed F, and is then rotated by the second wheel 34 in a tangential direction, to be deposited parallel along the joining line 15 of the textile material 11. Consequently, the second nozzle 48, positioned in correspondence with the second wheel 34, is configured with an exit channel 60 for the air for heating the adhesive, which is directed substantially orthogonal to the tape 32 which is moved by the second wheel 34. It is advantageous to optimize the distance between the exit of the channel 60 and the surface of the tape 32 to be heated, so that it is not too small, so as not to damage the tape 32, nor too big, to ensure that the adhesive is activated, thus optimizing the time and space allowed for the expansion of the hot air exiting from the second nozzle 48, so that it does not get excessively cold and can efficiently activate the adhesive.

Advantageously, moreover, the operating head 58 of the blower device 38 has such an extension along the direction of feed F that the distance between first nozzle 46 and second nozzle 48 is optimized, so that the residual heat on the material, deriving from the cauterization, can also assist the adhesion operation.

Advantageously, at least the blower device 38 and the associated feed circuit 42 and super-heater unit 44 are mounted on a mobile slider 40, which is selectively positionable both in a longitudinal direction parallel to or coinciding with the direction of feed F, and in a direction transverse to said direction of feed F, advantageously orthogonal, and also along an angular path lying on a transverse plane, advantageously orthogonal, to the support plane 22.

The machine 10 can be managed and controlled in all its features, both productive, including the operation of feeding the textile material 11, the tape 32 and cauterization of the third layer 20 along the joining line 15, and also in the positioning, monitoring the operating and alarm conditions, by an operator using an electronic programmer 90, advantageously a video interface equipped with data input and command means, in this case a touch screen.

Advantageously, the positioning in the longitudinal direction of the mobile slider 40 can be precisely adjusted using first linear adjustment means 65, in this case which can be activated manually and comprise a first rotating knob 66 that rotates a shaft (not visible in the drawings) connected by means of conical coupling to a worm screw (not visible in the drawings) that determines the alternate longitudinal movement of the mobile slider 40.

Furthermore, the transverse positioning of the mobile slider 40 is adjustable using second linear adjustment means 67, which determine its sliding along transverse guides 68. In this case the second linear adjustment means 67 allow both an approximate positioning using first piston pneumatic means 70 driven along the corresponding travel by means of a command given for example through the electronic programmer 90, and also a precise manual positioning by means of a second rotating knob 69 which cooperates with the first piston pneumatic means 70.

Moreover, first angular adjustment means 71 are provided, which determine the controlled rotation and angular positioning, as indicated by arrow G, of the mobile slider 40.

In this case too, the first angular adjustment means 71 allow both an approximate angular positioning using second piston pneumatic means 75 driven by a command given for example through the electronic programmer 90, and also a precise manual angular positioning by means of a third rotating knob 73 which cooperates with the second piston pneumatic means 75.

This possibility of adjusting the position of the mobile slider 40 in two directions, and also the angular adjustment thereof, first of all allows to locate the mobile slider 40, and the components installed on it, transversely and on each occasion in the operating position aligned with the direction of feed, and in the non-operating position, outside the direction of feed. Furthermore, it is possible to translate the mobile slider 40 longitudinally in the direction of feed F, so as to bring it closer to or distance it along the support plane 22 and with respect to the tape 32 being fed. Once the mobile slider 40 has been moved transversely to the operating position, it can be positioned in substantial correspondence with the tape 32, so as to define a first approximate adjustment of the reciprocal position between blower device 38 and tape 32.

Finally, once the approximate approach of the blower device 38 has been made, the angular adjustment allows to make a fine and precise adjustment of the position of the latter with respect to the tape 32, so that the distance between the exit of the channel 60 of the second nozzle 48 is in the optimum position, as described above, with respect to the tape 32. The step of selective angular adjustment can be carried out easily and intuitively, so as to perform various trial sealing operations in order to verify the quality thereof and to progressively identify the optimum distance to be set during production, according to the type of tape 32 and textile material 11 to be sealed.

After the cauterization carried out in this case using the blower device 38, on the same machine 10 and immediately afterward, the impermeable adhesive tape 32 is applied and welded on the cauterized part fed by the second movement device 30.

FIGS. 7, 8, 9 and 10 each show the steps of cauterization and hot taping performed on four different types of stitch or join, from the top down, a double stitch (a), a traditional hemstitch (b), a simple stitch (c), and an ultrasound join with cut (d).

Figure 8:
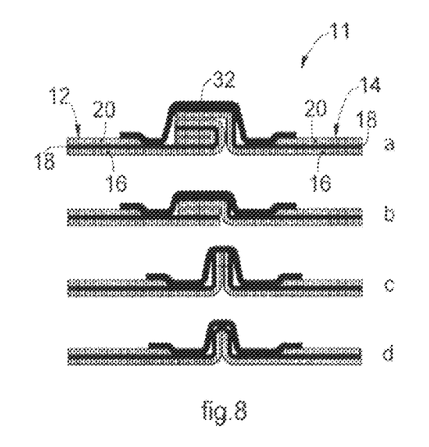
FIG. 8 is a schematic representation in section of the two panels in FIG. 7 also subjected to hot taping with the machine of the present invention.
Figure 10:
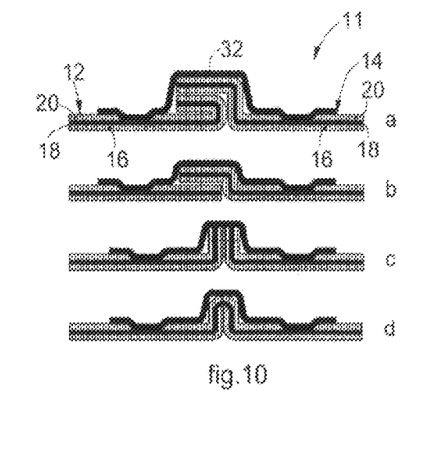
FIG. 10 is a schematic representation in section of the two panels in FIG. 9 also subjected to hot taping with the machine of the present invention.

In particular, FIGS. 7 and 9 show the cauterization, single- and double-track, while FIGS. 8 and 10 show how the tape 32 is applied on the cauterized zone along the joining line 15, obtained according to the four variants shown, and at the sides of the joining line 15, respectively in the case of a single-track and a double-track shown in FIGS. 7 and 9.

For the purposes of hot taping, in the solution shown in FIGS. 1-6, the machine 10 comprises a reel 72 to feed the tape 32, which is guided by a guide element 74 toward the second movement device 30, where it is welded along the joining line 15 in the zone subjected to cauterization.

A cutting member 80 is advantageously provided to cut, at desired intervals and lengths, the tape 32 which is deposited. In the solution shown in FIG. 4, the cutting member 80 consists of a first mobile blade 82 and a second fixed blade 84, which functions as a cutting abutment.

The tape 32 can be fed without adhesive, and in this case a device is provided to transfer the adhesive onto the tape 32: the device is a known type, for example as described by the patent application EP-A-1.749.658 in the name of the present Applicant. Otherwise, the tape 32 can be purchased and supplied with the adhesive already applied upon it, according to needs.

In this case, the machine 10 also comprises a device 76 for the programmed tensioning of the tape 32, of a known type which, in order to achieve recesses, curls and variations, has the task of determining a desired tension of the tape 32 being fed toward the textile material 11, independently of the tension possessed by the tape 32 downstream of the device 76. In this way the machine 10 is freed from any lack of uniformity or anomalies in the tension which can derive from the feed of the tape 32 or the operation of transferring the adhesive, if envisaged. The effect is to keep the tape 32 extended normally with a tension of a few grams and, when required, to supply a desired tension in the desired position and for the desired length.

It is clear that modifications and/or additions of parts may be made to the machine 10 for making an impermeable join on impermeable three-layer or two-layer fabrics as described heretofore, without departing from the field and scope of the present invention.

In particular, FIGS. 11-16 show another form of embodiment of the machine 10, in which the heating means able to determine the cauterization of the material of the third internal layer 20 comprise an irradiation heating device 138 which, without entering into contact with the third internal layer 20, determines the desired cauterization thereof along the joining line 15. This form of embodiment is particularly indicated when the second layer 18 (membrane) and/or the third internal layer 20 consist of particularly delicate materials.

The irradiation heating device 138, which in this case is directly associated with the blower device 38, may be formed by one or more blocks, made of a suitable metal material with adequate properties of heat conductivity and heated to a temperature suitable to determine the cauterization by irradiation, for example up to a value in the range of 400° C. or more, advantageously using the same air super-heater unit 44 as described above, or by means of other dedicated heating members, such as wire-type electric resistances or suchlike.

Figure 11:
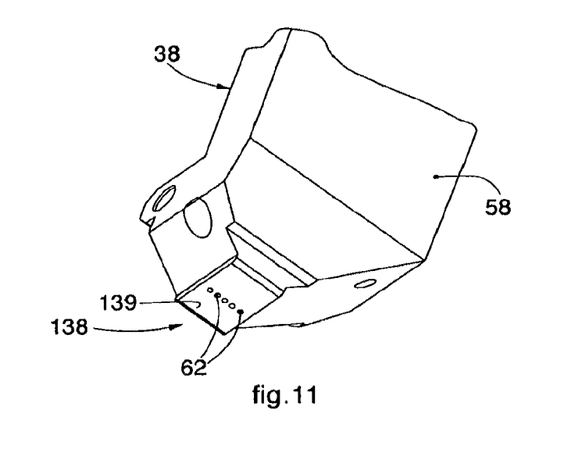
FIG. 11 is a perspective view of a first variant of the machine in FIG. 1 for single-track cauterization.
Figure 12:
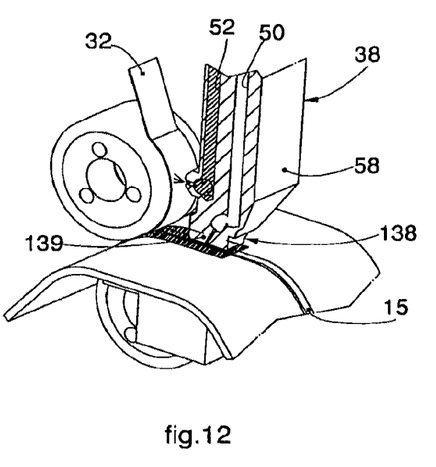
FIG. 12 is a perspective view of part of the machine in FIG. 1 provided with the first variant of FIG. 11 in an operating condition of cauterization by irradiation.
Figure 13:
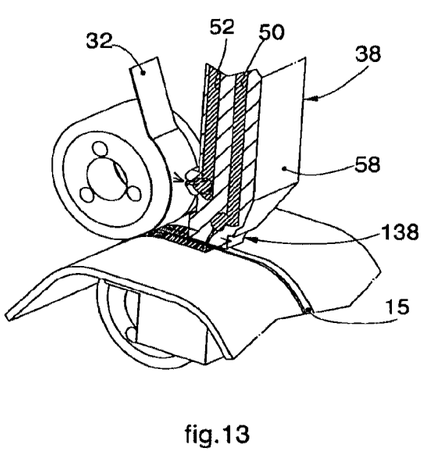
FIG. 13 is a perspective view of part of the machine in FIG. 1 provided with the first variant of FIG. 11 in an operating condition of cauterization by super-heated compressed air.

In this case, FIGS. 11-13 show a first variant usable for single-track cauterization, in which the irradiation heating device 138 comprises a single irradiation block 139 which is heated as described above, in this case associated with the first nozzle 46, and which has the sole row of channels 62, or the sole channel with elongated shape, to deliver the super-heated air.

For using this first variant with its irradiation technique, the operating head 58 is positioned so that the overall bulk of the irradiation heating device 138 is disposed completely above the zone to be subjected to cauterization.

Figure 12A:
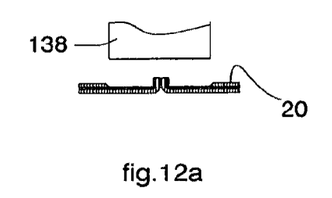
FIG. 12a is a schematic representation of the cauterization by irradiation in the condition of FIG. 12.

In particular, FIG. 12 shows the condition in which, for single-track cauterization, only the irradiation technique is used, by means of the sole irradiation block 139 disposed completely overlapping the zone to be cauterized, without determining any stream of super-heated air through the first nozzle 46, as can also be seen easily in the schematic detail in FIG. 12a, which shows the cauterization operation using irradiation, similar to what is shown in FIG. 7. In FIG. 12 the first branch 50 is shown graphically without shading, to indicate there is no stream of super-heated air. This can be obtained by closing the first valve 54 of the first branch 50 associated with the first nozzle 46, so as to prevent the passage of super-heated air toward the third layer 20.

Figure 13A:
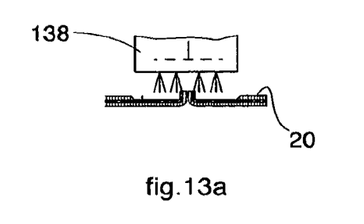
FIG. 13a is a schematic representation of the cauterization by super-heated compressed air in the condition of FIG. 13.

FIG. 13 instead shows the condition in which, for single-track cauterization, only the super-heated air is used through the first nozzle 46, as can easily be seen in the schematic detail of FIG. 13a which shows the blade of super-heated air produced toward the zone to be cauterized, in this case too in the same way as shown in FIG. 7. In FIG. 13 the first branch 50 is shown graphically with shading, to indicate the stream of super-heated air. In this condition, as well as opening the first valve 54, the operating head 58 is moved backward, to a different position, compared with FIG. 12, so that the outlet of the super-heated air is aligned with the start-of-cauterization zone and so that the irradiation heating device 138 is not positioned completely above the latter, substantially preventing any irradiation phenomena on the zone to be cauterized.

It is also possible, for certain types of fabrics, to cauterize the third layer 20 by combining the two techniques, that is, irradiation and air heating. In order to obtain this, the operating head 58 is positioned as in FIG. 12, so that the irradiation heating device 138 is disposed completely above the zone to be cauterized which is affected by the heat irradiation phenomenon; moreover, the passage of super-heated air is permitted, as in FIG. 13, to produce the blade of super-heated air toward the third layer 20 to be cauterized.

Figure 14:
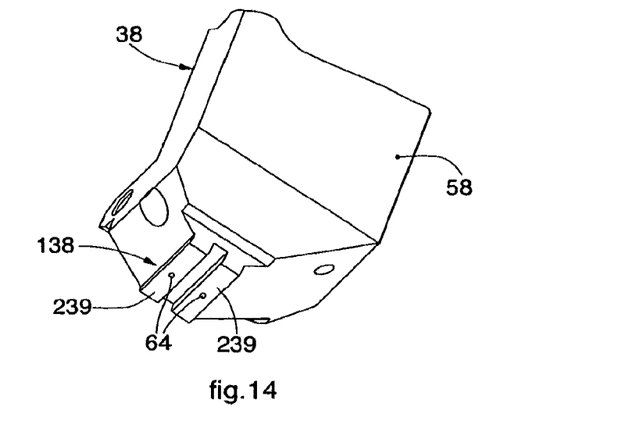
FIG. 14 is a perspective view of a second variant of the machine in FIG. 1 for double-track cauterization.
Figure 15:
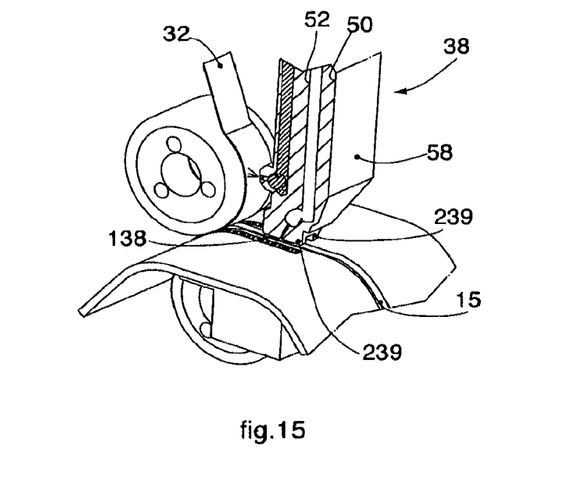
FIG. 15 is a perspective view of part of the machine in FIG. 1 provided with the second variant of FIG. 14 in an operating condition of cauterization by irradiation.
Figure 15A:
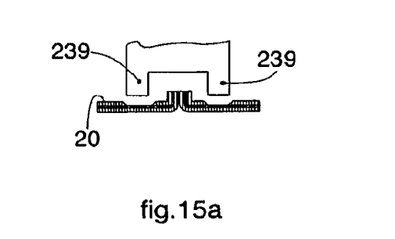
FIG. 15a is a schematic representation of the cauterization by irradiation in the condition of FIG. 15.
Figure 16:
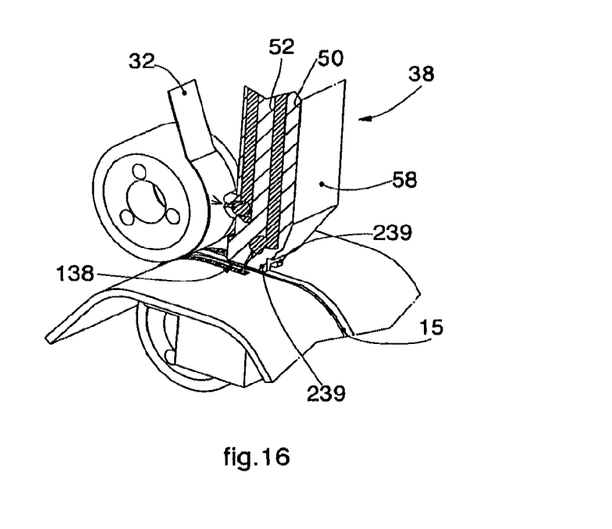
FIG. 16 is a perspective view of part of the machine in FIG. 1 provided with the second variant of FIG. 14 in an operating condition of cauterization by super-heated compressed air.
Figure 16A:
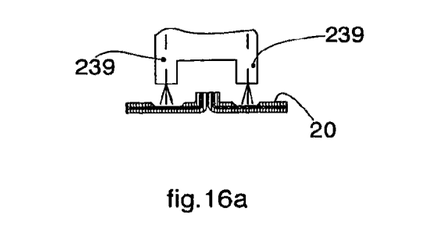
FIG. 16a is a schematic representation of the cauterization by super-heated compressed air in the condition of FIG. 16.

FIGS. 14-16 show a second variant of the irradiation heating device 138, usable for double-track cauterization, which comprises a pair of separate irradiation blocks 239, each of which is able to cauterize through heat irradiation distinct lateral zones astride the joining line 15: it functions in exactly the same way as the first variant shown in FIGS. 11-13.

In particular, in the case of FIG. 14, each irradiation block 239 is shown also provided with a corresponding channel 64 to deliver super-heated air, to be able to selectively use the irradiation technique, the super-heated compressed air technique or a combination of both. FIG. 15 shows the condition in which only the irradiation technique is used, as shown in the schematic detail of FIG. 15a, identical to what is shown in FIG. 9, while FIG. 16 shows the condition in which the blade of super-heated air is used, as shown in the schematic detail of FIG. 16a, also identical to what is shown in FIG. 9. It is clear that, in the second variant too, the techniques of irradiation and heating with compressed air can be combined, by suitably positioning the operating head 58 so that the irradiation blocks 239 are above the zone to be cauterized and by activating the stream of super-heated air.

The invention claimed is:

1. A machine for making an impermeable join between two panels made of three-layer or two-layer textile material comprising at least an internal layer, already joined along a joining line by means of a stitching operation, simple or complex, or by ultrasound joining or other, comprising first movement means able to move the textile material in a direction of feed and impermeabilization means able to achieve the impermeabilization along said joining line and comprising second movement means able to move an impermeable tape for hot taping with adhesive, in order to determine the hot application and welding on said internal layer along said joining line, wherein said impermeabilization means also comprise heating means suitable to effect a cauterization of the material of said internal layer and positionable directly upstream of said second movement means in said direction of feed, so that the hot taping can be effected immediately after the cauterization.

2. The machine as in claim 1, wherein said heating means comprise an irradiation heating device, able to be taken into close proximity, but not in contact, with the internal layer along the joining line, and to heat said internal layer by irradiation, obtaining the cauterization thereof.

3. The machine as in claim 1, wherein the heating means comprise a blower device able to blow compressed and super-heated air at least toward the joining line and on the sides adjacent thereto, in order to determine the cauterization of the internal layer.

4. The machine as in claim 3, wherein said blower device is also configured to blow heating air toward said tape.

5. The machine as in claim 3, wherein the blower device is fluidically connected to an air feed circuit, preferably compressed air at a pressure comprised between about 1.5 bar and 2.5 bar.

6. The machine as in claim 5, wherein said feed circuit is associated with an air super-heater unit able to increase the temperature of the air, preferably to between about 200° C. and about 350° C.

7. The machine as in claim 3, wherein the blower device comprises a first blower nozzle to blow super-heated air, and a second blower nozzle, downstream of the first nozzle in the direction of feed, to blow the hot air toward the tape.

8. The machine as in claim 5, comprising a first blower nozzle to blow super-heated air, and a second blower nozzle, downstream of the first nozzle in the direction of feed, to blow the hot air toward the tape, wherein the feed circuit comprises two air feed branches that are independent from each other, of which a first branch is connected to the first nozzle and a second branch is connected to the second nozzle.

9. The machine as in claim 7, wherein the first nozzle has a single row of delivery channels, or a single channel with an elongated shape, in order to determine substantially a single jet of super-heated compressed air and perform a single-track cauterization along said joining line.

10. The machine as in claim 7, wherein the first nozzle has a pair of delivery channels, by means of which a pair of jets of super-heated compressed air is determined, distanced from each other astride said joining line, in order to perform a double-track cauterization along said joining line.

11. The machine as in claim 7, wherein the second nozzle comprises at least an exit channel for the air for heating the adhesive, positionable substantially orthogonal with respect to the tape.

12. The machine as in claim 1, comprising a mobile slider on which at least said heating means are mounted, said mobile slider being selectively positionable both in a longitudinal direction parallel to or coinciding with the direction of feed, and in a direction transverse to said direction of feed, and also along an angular path.

13. The machine as in claim 12, comprising first linear adjustment means to adjust the positioning of the mobile slider in the longitudinal direction.

14. The machine as in claim 12, comprising second linear adjustment means to adjust the transverse positioning of the mobile slider.

15. The machine as in claim 12, comprising first angular adjustment means that determine the controlled rotation and angular positioning of the mobile slider.

16. Impermeabilization means able to achieve the impermeabilization of two panels made of three-layer or two-layer textile material comprising at least an internal layer, already joined along a joining line by means of a stitching operation, simple or complex, or by ultrasound joining or other, along said joining line and comprising movement means able to move an impermeable tape for hot taping with adhesive, in order to determine the hot application and welding on said internal layer along said joining line, wherein said impermeabilization means also comprise heating means suitable to effect a cauterization of the material of said internal layer and positionable directly upstream of said second movement means, so that the hot taping can be effected immediately after the cauterization.

17. A method for using the machine of claim 1 to achieve an impermeable join between two panels made of three-layer or two-layer textile material comprising at least an internal layer, already joined along a joining line by means of a stitching operation, simple or complex, or by ultrasound joining or other, which provides to move the textile material in a direction of feed and to perform the impermeabilization along said joining line by the hot application and welding, on said internal layer along said joining line, of an impermeable tape for hot taping with adhesive, wherein said impermeabilization provides to effect a cauterization of the material of said internal layer immediately before the hot taping.

18. The method as in claim 17, wherein said cauterization is effected by heating the joining line using super-heated compressed air, by irradiation, or by both said two heating systems, as a function of the type of internal layer.

* * * * *